United States Patent [19]

Engel et al.

[11] 4,391,094

[45] Jul. 5, 1983

[54] DESTRUCTABLE AIR INLET COVER FOR ROCKET ENGINES

[75] Inventors: Herbert Engel, Munich; Horst Boettger, Zorneding, both of Fed. Rep. of Germany

[73] Assignee: Messerschmitt-Bölkow-Blohm Gesellschaft mit Beschränkter Haftung, Fed. Rep. of Germany

[21] Appl. No.: 225,607

[22] Filed: Jan. 16, 1981

[30] Foreign Application Priority Data

Jan. 29, 1980 [DE] Fed. Rep. of Germany ....... 3003004

[51] Int. Cl.³ .......................... F02K 7/10; F02K 9/08
[52] U.S. Cl. ......................................... 60/245; 60/251
[58] Field of Search ................. 60/225, 244, 245, 250, 60/254, 270 R, 270 S; 102/477, 484, 705

[56] References Cited

U.S. PATENT DOCUMENTS 3,038,303  6/1962  Gose ..................................... 60/254
3,901,028  8/1975  Leingang .............................. 60/225

FOREIGN PATENT DOCUMENTS 1351051  4/1974  United Kingdom .
1378079  12/1974  United Kingdom .
2038918  7/1980  United Kingdom ................ 102/377

Primary Examiner—Carlton R. Croyle
Assistant Examiner—Timothy S. Thorpe
Attorney, Agent, or Firm—McGlew and Tuttle

[57] ABSTRACT

An improved combination of a cover for closing the air inlet openings into the combustion chamber of a jet rocket engine and strike device for destroying the cover is disclosed. In accordance with the improved arrangement, the cover is composed of a material which is internally prestressed and a device is provided for retaining the strike device in a prestrike position relative to the cover which is operative to release the strike device upon the reaching of a predetermined magnitude of the pressure acting on the strike device.

5 Claims, 4 Drawing Figures

DESTRUCTABLE AIR INLET COVER FOR ROCKET ENGINES

FIELD AND BACKGROUND OF THE INVENTION

This invention relates to rocket engines in general and, in particular, to a new and useful cover of easily destructible material for closing the air inlet openings into the combustion chamber, in particular of ram jet rocket engines and to a strike or ignition device activated by internally generated pressure for destroying the cover at the end of the launch operation and at the beginning of cruising.

In ram jet rocket engines, there is provided for the launch phase, as described in U.S. Pat. No. 3,901,028, a solid rocket fuel, often in a common combustion chamber. The fuel brings the missile to the high flight velocity required for ram jet operation. The velocity is suitable for making sufficient air quantities available at a sufficient pressure for cruising operation. During the cruising operation, air oxygen and fuel-rich gases produced by a solid fuel are brought to reaction in a combustion chamber. Contiguous to the combustion chamber is a convergent-divergent propelling nozzle which transforms the pressure energy generated in the combustion chamber into outflow or reaction energy. In order to keep the air inlet or inflow openings to the combustion chamber closed during the launch phase, covers of easily breakable material are provided at the openings.

After completion of the launch phase and at the beginning of the cruising phase, the covers are destroyed by outside action, so that the air inflow openings are then free. Due to the available ram pressure of the air, the cover fragments are rearwardly ejected via the combustion chamber and through the propelling nozzle into the surrounding environment. It is possible to disintegrate the cover with a pyrotechnic charge or by a mechanical strike device by means of a pretensioned spring.

A special problem resides in eliminating the covers at the right time and, above all, disintegrating them into minute pieces, in order to protect the missile or the internal systems of the engine, respectively, while not endangering other missiles possibly flying along in formation therewith.

SUMMARY OF THE INVENTION

An objective of the invention, therefore, is to solve this problem both as to material and also to provice an arrangement which is functionally better than before, namely, for one thing, by using for the cover which closes the air inlet during the launching phase, a destructible material which does not endanger, during destruction thereof, the safety of the engine or of any missles flying along therewith, and which activates the installed strike device in such a manner that destruction of the cover occurs at a precalculated moment.

In accordance with the invention, this task is solved with a cover composed of a material with internal prestress, in particular glass, with the provision of a fixing means for retention of the strike device, which is eliminated or taken out of operation only as the predetermined or nominal magnitude of a pressure acting on the strike device is reached.

In accordance with a feature of the invention, the fixing means is composed of a tear member which is destroyed as the nominal pressure bearing on the strike device is reached.

According to the invention, a pull member may be provided as the tear member, in particular, a tearable wire, which is fastened on the one hand in the housing and, on the other hand, at the strike device.

In accordance with another feature of the invention, the fixing means may comprise an elastic sleeve which connects the strike device with the housing directly or indirectly.

The further possibility exists, according to an embodiment of the invention, of retaining the strike device, until it is used, by a form-locking blocking means, in particular, an electromagnetically controlled latch.

It is a still further feature of the invention, in an embodiment having a pyrotechnic charge to be ignited electrically for generating the pressure onto the strike device, to mount the strike device in the housing accessible from outside thereof and to connect both the pyrotechnic charge and the strike device through an elastic sleeve as the fixing means, with a set screw, which is adjustable by electric contacts in relation to housing-fast counter-contacts.

It is a further object of the present invention to provide an improved arrangement in combination with a combustion chamber of a rocket engine housing, in particular, of a ram jet rocket engine housing, of the type having a cover of easily destructible material for closing the air inlet openings into the combustion chamber, and a strike device activated by generated pressure for destroying the cover at the end of the launch operation and at the beginning of cruising, the improvement wherein the cover is made of a material having internal prestress and further comprising fixing means for retaining the strike device in a prestrike position relative to the cover and, wherein, said fixing means is operative to release said strike device upon reaching a predetermined magnitude of pressure acting on the strike device, whereby, the strike device is operative to contact the cover and destroy it.

A further object of the invention is to provide an improved cover and strike device arrangement which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
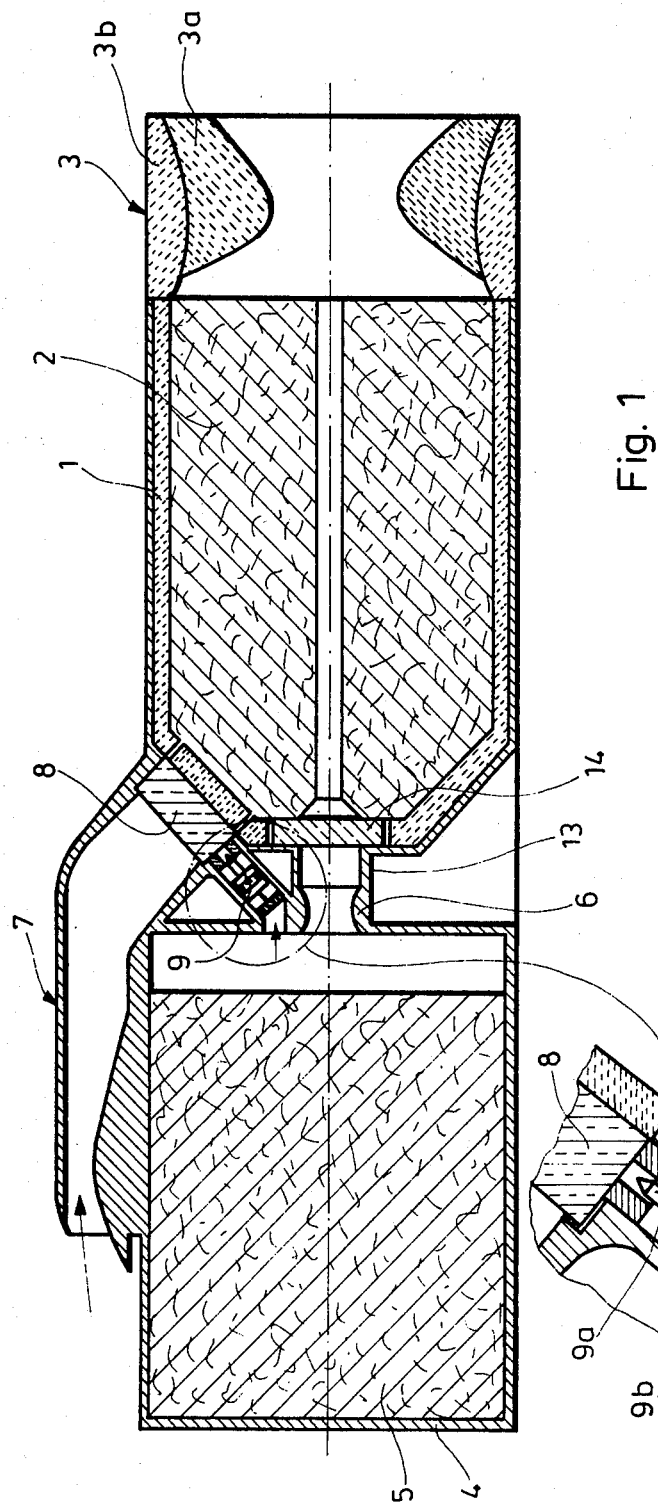
FIG. 1 is a longitudinal section of a ram jet rocket engine according to the present invention.
Figure 1A:
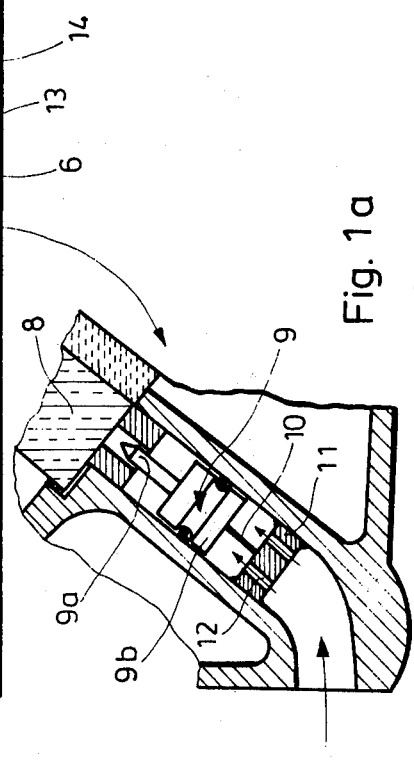
FIG. 1a is an enlarged detail of a portion of FIG. 1 illustrating a cover and a strike device, as well as a fixing means.

Referring to the drawings in particular, there is shown an improved arrangement of a cover of easily destructible material for closing the air inlet openings into the combustion chamber of a rocket engine housing.

As is evident from FIG. 1, the rocket and ram jet engine for launching as well as for cruising is essentially composed of a combustion chamber 1 within which a launch propellant charge 2 is inserted. The charge 2 contains the oxygen required for complete combustion in chemically combined form. A propelling nozzle 3 is provided contiguous to the back of the common combustion chamber 1. The propelling nozzle 3 is composed of a propelling nozzle part 3a for the launch phase and of a propelling nozzle part 3b for the cruising phase. During the launch phase, the propelling nozzle part 3a is continuously depleted or eliminated.

The central front region of the ram jet engine is formed with a precombustion chamber 4 in which a cruising propellant charge 5 is stored. As the cruising propellant charge burns down, during the cruising phase, it generates fuel-rich gases which are conveyed via an inflow nozzle 6 into the common combustion chamber 1, where oxygen from the atmosphere is supplied, for stoichiometric combustion. The air supply occurs via one or more air inlets 7, having an opening into the common combustion chamber 1 which is closed by a cover 8 until the end of the launch phase.

Cover 8 is composed of a prestressed material, in particular, glass having internal prestress. Commercial thermally prestressed glass, as often used for automobile windshields shatters or bursts into minute fragments upon local mechanical overload due to the high compressive stresses in the glass surface produced in prestressing. The prestress is usually brought about by thermal treatment methods. Recently, in addition, chemical treatment methods have been practiced with the replacement, for example, of sodium ions by calcium ions in the glass surface. Today, moveover, not only can the material "glass" be prestressed thermally or chemically, but these treatment methods are applicable to other materials, for example, to ceramic substances, such as aluminum oxide.

Cover 8 is destroyed by a mechanical strike device 9, which is composed of a bolt 9a ending in a sharp point in front and a piston 9b. The piston 9b is fixed in its position, as shown, through a tie rod or pull member 10 which is connected with an anchoring member 11, fixedly connected to the housing, in which flow bores 12 are provided. The gas pressure created in the precombustion chamber propagates through bores 12 and acts on the piston 9. When a predetermined pressure value is reached, that is, the nominal pressure in the precombustion chamber 4, the pull member 10 breaks and bolt 9a strikes on cover 8, thereby shattering the cover 8 into minute fragments which are discharged through the propelling nozzle 3 without harm to the engine. The tensile strength of the pull member 10 is therefore adapted to the prevailing nominal pressure. In addition, a plate 14 closing the inflow channel 13 is provided. The plate 14 is preferably made of the same material as the cover 8 and is destroyed on reaching the nominal pressure.

Figure 2:
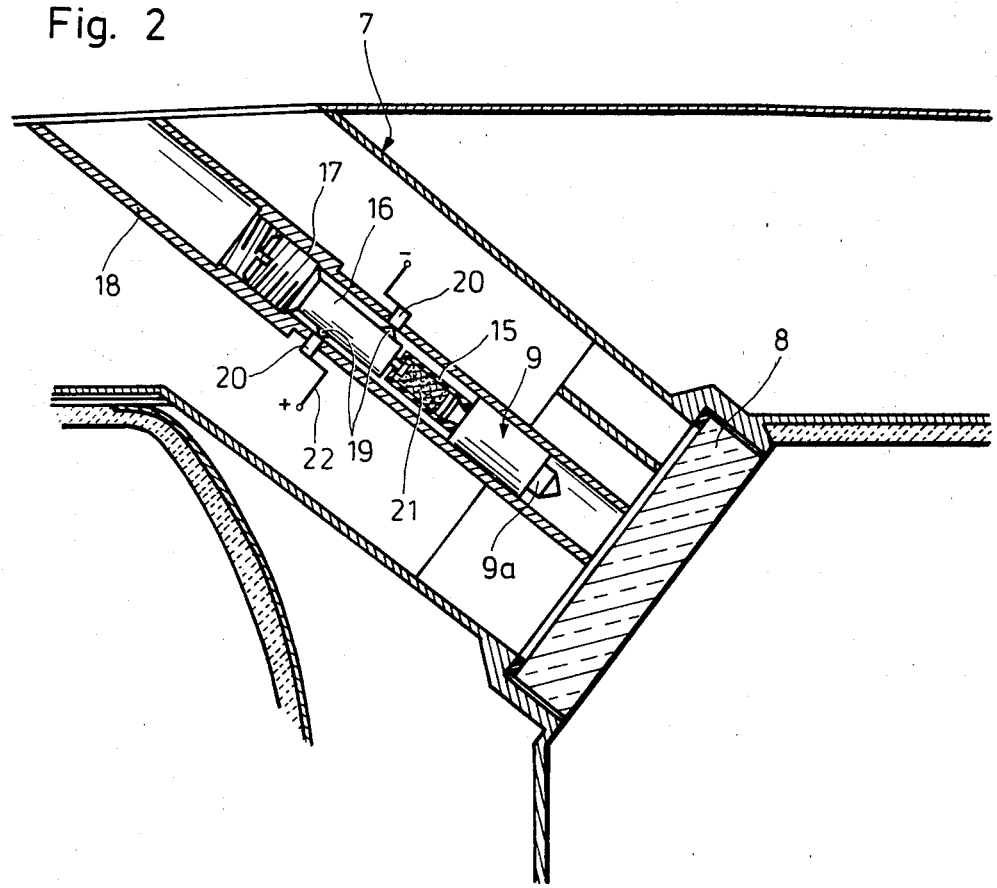
FIG. 2 illustrates a cross-sectional view of a cover and strike device arrangement in accordance with an alternate embodiment of the invention.

In FIG. 2, the strike device 9 is connected through an elastic sleeve 15 with a set screw 16 which, via a thread 17, is arranged in a guide tube 18 mounted to the housing for longitudinal movement in the air inlet 7. The set screw 16 has electric contacts 19, which match with counter-contacts 20 fastened to the guide tube. Inside of the elastic sleeve 15, which acts as fixing means for the strike device 9, a pyrotechnic charge 21 is provided, which is ignited via the electric ignition circuit 22 when cover 8 is to be destroyed and the air inlet into the combustion chamber 1 cleared, that is, at the end of the launch phase or at the beginning of the crusing phase. By the structurally and functionally integrated unit 9, 15, 16, 19 and 21 and its arrangement 18, 20, not only is it possible to exactly fix the moment for the destruction of the cover 8, but it allows also that this unit need not be installed until just before the military use of the missile. In other words, a long-term problematic storage of the pyrotechnic energy source for this purpose inside of the missile is thus not necessary, so that failure in this respect is avoided.

Figure 3:
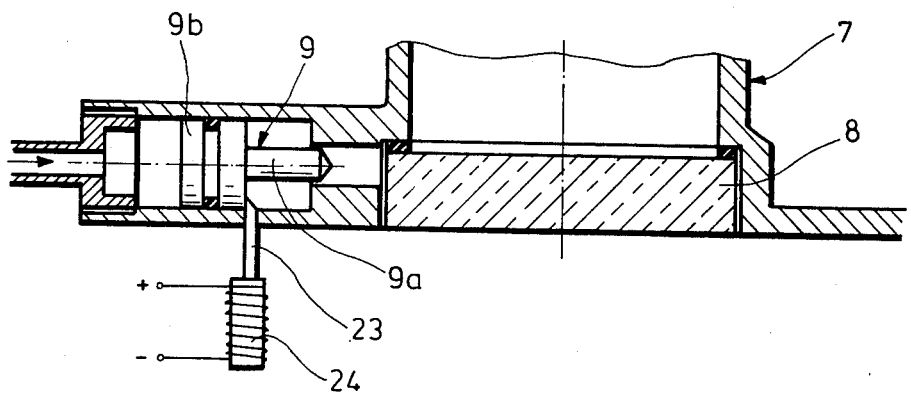
FIG. 3 is a cross-sectional view of a cover and strike device arrangement in accordance with still another alternate embodiment of the invention.

As is evident from FIG. 3, for fixing the strike device 9 in its starting position, there is provided a latch 23, which is opened by an electromagnetic means, such as electromagnet 24, at the proper moment so that it then releases the strike device 9, and the nominal pressure then prevailing in the precombustion chamber 4 can act on the piston 9b.

While specific embodiments of the invention have been shown and described in detail to illustrate the application of the principles of the invention, it will be understood that the invention may be embodied otherwise without departing from such principles.

What is claimed is:

1. In combination with a combustion chamber of a rocket engine housing, in particular of ram jet engine housings, of the type having a cover of easily destructible material for closing the air inlet openings into the combustion chamber, and a strike device activated by generated pressure for destroying the cover at the end of the launch operation and at the beginning of cruising, the improvement wherein, the cover is made of a material having internal prestress, and further comprising, fixing means for retaining the strike device in a prestrike position relative to the cover, and wherein, said fixing means is operative to release said strike device upon reaching a predetermined magnitude of a pressure acting on the strike device, said fixing means comprising a tear member which is ruptured upon the reaching of said predetermined pressure acting on the strike device, said tear member comprising an elastic sleeve, a pyrotechnic charge mounted in said elastic sleeve electrically ignitable to generate a pressure onto the strike device, a guide tube, said pyrotechnic charge, said elastic sleeve and the strike device being removably mounted in said guide tube adjacent to the cover, a set screw connected to said elastic sleeve threadedly connectable to said guide tube, means for electrically igniting said pyrotechnic charge including electric contacts on said elastic sleeve and said guide tube, and said set screw being adjustably connectable to said guide tube to align said electric contacts.

2. A ram jet engine construction, comprising a tubular body having a precombustion chamber, an outflow passage adjacent one end of said precombustion chamber, a main combustion chamber connected to said outflow passage, an inlet passage connected into said main combustion chamber, an air control passage connected between said precombustion chamber and said inlet passage, a breakable cover closing said inlet passage to the atmosphere, and a movable pressure-responsive striker device disposed in said air control passage and exposed to pressure in said precombustion chamber and responsive to a predetermined pressure to strike and destroy said cover to open said inlet passage to supply said main combustion chamber with inlet air.

3. A ram jet engine according to claim 2, wherein said striker device comprises a piston movable in said air control passage and exposed on one side to the pressure of said precombustion chamber having a bolt at its opposite end with a sharp end engageable with said cover to strike and destroy said cover.

4. A ram jet engine construction, comprising a tubular body having a precombustion chamber, an outflow passage adjacent one end of said precombustion chamber, a main combustion chamber connected to said outflow passage, an inlet passage connected into said main combustion chamber, an air control passage connected between said precombustion chamber and said inlet passage, a breakable cover closing said inlet passage to the atmosphere, and a removable pressure-responsive striker device disposed in said air control passage including a pyrotechnic charge which is ignitable to effect striking and destruction of said cover to open said inlet passage to supply said main combustion chamber with inlet air.

5. A movable air inlet control device for a ram jet engine which includes a precombustion chamber connected through a flow passage to a main combustion chamber which has an inlet having a breakable cover closing said inlet which may be broken to permit air to enter into said main combustion chamber for combustion, comprising a tubular connection between said air inlet passage and said precombustion chamber, a striker device movable in said tubular connection, means for exposing said striker device to the pressure of said precombustion chamber so as to effect movement of said striker device to destroy said cover and open said air inlet on the occurrence of a predetermined pressure in said precombustion chamber.

* * * * *